Patented Sept. 15, 1953

2,652,410

UNITED STATES PATENT OFFICE 2,652,410

ESTERS OF ALPHA-HYDROXY ACIDS AND THEIR ESTOLIDES

Orin D. Cunningham and Orville L. Polly, Long Beach, Calif., assignors to Union Oil Company of California, Los Angeles, Calif., a corporation of California No Drawing. Application October 12, 1948, Serial No. 54,204

12 Claims. (Cl. 260—404.5)

This invention relates generally to improved methods for reacting alpha-hydroxy acids and/or estolides with polyhydric alcohols. More particularly, this invention relates to improved methods for esterifying and dehydroxylating alpha-hydroxy acids and/or estolides such as are obtained by the controlled oxidation of paraffin wax.

New methods for oxidizing paraffinic waxes and for fractionating and refining the oxidized waxes obtained thereby are disclosed in our copending application, Serial No. 21,846, filed April 19, 1948, by which methods high yields of relatively pure alpha-hydroxy acids and estolides are produced. The conditions for converting alpha-hydroxy acids into their estolides as well as the conditions for converting estolides back to alpha-hydroxy acids are disclosed therein. Methods for esterifying alpha-hydroxy acids and/or estolides with either monohydric or polyhydric alcohols were disclosed by which methods the course of the reaction can be directed to the normal undehydroxylated esters of alpha-hydroxy acids or of estolides or alternatively to the esters of dehydroxylated estolides wherein the hydroxyl group of the estolide has been replaced by an ethylenic bond which is in the alpha-beta position with respect to the ester linkage of the estolide.

The esterification of estolides and/or their alpha-hydroxy acids with polyhydric alcohols is generally characterized by the formation of a viscous gel prior to the complete esterification and dehydroxylation of the reaction mixture. The effect is especially pronounced in esterification reactions involving alcohols having three or more hydroxyl groups and is less pronounced with dihydric alcohols. In such cases the viscosity of the reaction mixture increases slowly over a relatively long period, then increases rapidly over a shorter period and finally forms a solid or semi-solid gel. The solubility of the reaction mixture in aromatic solvents is generally high prior to gelation and decreases rapidly during gelation. The gelled products are generally insoluble in such solvents. While we do not wish to be bound by theory, it is believed that the gelation is produced by extensive cross-linking of the reacting molecules which are either cross-linked ester-type linkages or combinations of ester linkages which are cross-linked through polymerization reactions involving the ethylenic bonds formed by dehydroxylation of estolides.

The partly or completely gelled esterification mixtures are variously useful as components in linoleum cementing compositions, and in the case of the highly dehydroxylated products as substitutes for linseed oil and drying oil compositions. According to the methods described in our copending application referred to hereinbefore, useful gelled esterified derivatives can be obtained by any one of three general methods. In the preferred method the dehydroxylation and esterification reactions are carried out simultaneously under conditions which promote both esterification and dehydroxylation of a reacting mixture comprising alpha-hydroxy acids and/or estolides and a polyhydric alcohol. In the second method the alpha-hydroxy acids and/or estolides are first subjected to dehydroxylating conditions to produce a dehydroxylated estolide from a mixture containing alpha-hydroxy acids and/or estolides. The unsaturated or dehydroxylated estolide is then esterified with a polyhydric alcohol to yield the desired gelled product. The third method involves the initial step of esterifying the alpha-hydroxy acids and/or estolides with the polyhydric alcohol under substantially non-dehydroxylating conditions and the subsequent step of dehydroxylating the esters under dehydroxylating conditions. The latter method is more difficult to control and generally gives a gelled product which is less completely dehydroxylated than is obtained by either of the two foregoing methods.

For many uses it is desirable or necessary to employ a non-gelled reaction product such as is obtained by discontinuing the reaction prior to the onset of gelation, while for other purposes a gelled or partially gelled product is more desirable. Where it is desired to produce the gelled product in large quantity, such as in commercial equipment, considerable difficulty is experienced in controlling the reaction to yield a product having a particular consistency because of the fact that the transition from the liquid to the gel takes place during a relative short period of time relative to the total reaction time at the normally employed reaction temperatures. Withdrawal and removal of the relatively insoluble gel from the reaction vessel adds to the difficulties of preparing the gel on a commercial scale according to the methods heretofore employed.

It has now been found that gelled or semi-gelled products of suitable quality can be prepared by a two-step process. The usual series of reactions, such as were employed previously, are carried out to effect the rapid reaction of the reactants at an optimum temperature until the gelling stage is approached. The liquid reaction mixture, which is readily pumpable, is then cooled and the gelation is effected at a slower and more readily controllable rate at the lower temperature. Advantage is taken of the fact that the incompletely reacted mixture is generally homogeneous liquid which requires no further stirring to complete the reaction. In one variation of the method the incompletely reacted mixture is withdrawn into shipping containers or other suitable vessels and the final curing or gelling step is effected at any desired time after the mixture has been stored or pumped or shipped to its destination.

It is an object of this invention to esterify alpha-hydroxy acids and/or estolides wtih polyhydric alcohols under conditions which permit close process control of the product quality and which are adapted to large scale commercial operations.

It is another object of this invention to esterify and dehydroxylate or otherwise react mixtures containing alpha-hydroxy acids and/or estolides with polyhydric alcohols in a two-stage process wherein the reaction mixture is first maintained at a higher temperature to effect a partial conversion at a rapid rate and the partially converted mixture is thereafter maintained at a lower temperature to complete the conversion to the gelation stage at a slower, more readily controllable rate.

It is another object of this invention to react mixtures containing alpha-hydroxy acids and/or estolides with pentaerythritol under conditions which promote the partial dehydroxylation of the alpha-hydroxy acids and/or estolides and esters thereof to a stage short of gelation, and to extend the reaction to the gelation stage at a lower temperature which is more favorable to obtaining close control of the product quality.

It is another object of this invention to cure partially esterified, partially dehydroxylated mixtures of alpha-hydroxy acids and/or estolides, with organic peroxides, organic hydroperoxides and the like, wherein the curing step effects reaction of the added curing agent with the reaction mixture and also extends the esterification and dehydroxylation reactions.

Briefly, this invention comprises methods for reacting polyhydric alcohols with alpha-hydroxy acids and/or estolides and/or dehydroxylated derivatives thereof, whereby a semi-solid or solid product is produced. The invention further relates to the uses of such products.

It is a usual characteristic of the reactions leading to the formation of solid or semi-solid esterified derivatives that the fluid reaction mixture thickens gradually during most of the reaction period after which period the viscosity of the reacting mixture changes very rapidly with respect to reaction time at the onset of gelation. The rapidly changing character of the gelling mixture increases the difficulty of producing esters of uniform quality and consistency in several successive preparations. Moreover, a reactor in which a gelled product has been prepared is usually difficult to clean because of the relative insolubility of the gel in common solvents normally employed for cleaning such reaction vessels.

In the reaction of alcohols with alpha-hydroxy acids and/or estolides and/or dehydroxylated derivatives thereof, according to the process of this invention, the conversion is partially completed at a higher temperature which temperature effects the rapid reaction of the reactants. The product of this initial step is thereafter subjected to a lower temperature curing step which completes the gelation reactions at a reduced rate thereby affording a greater control of product quality and consistency. The incompletely reacted material produced in the initial reaction step is a viscous liquid and is readily flowable through pumps, pipes and other such facilities. It is, moreover, soluble in such solvents as would normally be employed to clean the reaction vessel.

In one modification of the invention the alpha-hydroxy acids and/or estolides are first partially or completely converted to dehydroxylated derivatives which are subsequently heated at a higher temperature with a polyhydric alcohol for a period of time which is insufficient to produce gelation. The reaction mixture is withdrawn and cured as in the preceding case. In another modification of the invention various modifiers may be added to the reacting mixture either before or during the initial reaction stage and/or prior to the curing stage.

The preferred alpha-hydroxy acids and/or estolides for the preparation of components for linoleum cements and drying oils according to the process of this invention are those which are prepared by the oxidation of wax and isolated therefrom according to the methods disclosed in our copending application. These alpha-hydroxy acids obtained from the oxidation of paraffin waxes range mostly from approximately 5 to 30 carbon atoms per molecule while the estolides obtained thereby range from approximately 10 to 60 carbon atoms per molecule, depending to some extent upon the molecular size of the oxidation feed stock.

The paraffin waxes which are most suitable for the preparation of alpha-hydroxy acids and estolides are those which are essentially mixtures of straight chain normal paraffins containing between 15 and 50 carbon atoms per molecule or more, and preferably between about 20 and 35 carbon atoms per molecule. The wax is preferably a higher melting wax such as those refined waxes which melt above 90° F. and preferably above 120° F. A very suitable wax for the production of alpha-hydroxy acids and estolides is one which has been prepared by modern solvent refining technique. According to such methods a wax containing topped residuum is extracted with liquefied propane to separate the asphalt and the thus deasphalted oil in propane solution is subsequently dewaxed by chilling to temperatures in the neighborhood of 40° F. to crystallize the wax which is then separated from the propane oil solution. The precipitated wax containing some oil is deoiled by dissolving in a solvent such as methyl ethyl ketone and chilling to precipitate a deoiled wax. Such methods are well known and are generally described in U. S. Patent No. 2,229,658. The wax obtained by this or other solvent refining processes is relatively free of objectionable materials for wax oxidation purposes. Such waxes are substantially straight chain normal paraffins and are only slightly isoparaffinic.

The oxidation of the paraffin wax is carried out in the liquid phase by blowing the melted wax with an oxygen-containing gas until the desired acid number has been attained. The yield of alpha-hydroxyl acids and estolides obtained by the oxidation of wax is closely dependent upon the temperature of the oxidation. High temperatures promote the decomposition of the alpha-hydroxy acids and estolides into a mixture of less desirable products and from which the alpha-hydroxy acids and estolides are less readily separated in pure form. The oxidation is preferably carried out at a temperature above the melting point of the wax and below 140° C. The preferred temperature range is from 100 to 130° C. and it is in this temperature range that the greatest yield of the more easily refined alpha-hydroxy acids and estolides is obtained.

The concentration of alpha-hydroxy acids and estolides in the oxidized wax as well as the yield of these compounds per unit weight of wax is closely dependent upon the acid number to which the wax is oxidized. A high yield of easily refined alpha-hydroxy acids and estolides is obtained when the oxidation of the wax is continued until the acid number is between 200 and 250 and preferably in the range of about 210 to 240.

In the preferred method for isolating the alpha-hydroxy acids and estolides from the oxidized wax, the oxidized wax is preferably washed with hot water for the purpose of separating water-soluble components from the water-insoluble components. The water washing process is preferably conducted at or near the boiling point of water at which temperatures the oxidized wax is fluid. The water-insoluble, water washed fraction contains the desired alpha-hydroxy acids and estolides along with appreciable amounts of fatty acids and neutral compounds such as esters. The water-insoluble fraction is then washed with a non-polar solvent which is preferably a low boiling hydrocarbon such as naphtha, petroleum ether and the like. The extraction serves to dissolve most of the fatty acids and neutral oils from the hydrocarbon insoluble alpha-hydroxy acids and estolides. Alternatively, the separation of the alpha-hydroxy acids from the fatty acids and neutral oils can be expedited by treating the water washed oxidized wax with a concentrated solution of an alkali metal borate such as sodium borate with which salt the alpha-hydroxy acids and estolides form a complex thereby solubilizing them in the aqueous phase and extracting the resulting mixture with a hydrocarbon solvent. The solubility of the remaining neutral and acidic constituents in the hydrocarbon solvent is relatively unaffected by the presence of the sodium borate and a sharp separation of the two groups of compounds is obtained. The alpha-hydroxy acids and estolides are recovered as an oil phase by acidification of the borate-containing aqueous phase. The alternative borate refining method yields products ranging up to about 97% purity as contrasted to products of about 85% purity obtained by other methods. The mixture of alpha-hydroxy acids and estolides obtained by the oxidation of paraffinic wax according to these methods comprises about 30% alpha-hydroxy acids and about 70% estolides on a neutral oil-fatty acid-free basis. This mixture or similar mixtures can be treated to effect conversion of the alpha-hydroxy acid content to estolides by heating the mixture to a temperature in the range of 100 to 150° C. in the absence of a catalyst or to a temperature of about 60 to 100° C. in the presence of a suitable acid catalyst according to the method described hereinafter. Similarly, estolides are convertible to their respective alpha-hydroxy acids by a process of alkaline saponification and careful acidification of the saponified mixture in order to prevent intimate contact of the liberated alpha-hydroxy phase during the acidification with a strong mineral acid being added to effect the acidification. Alpha-hydroxy acids are converted to a mixture of estolides and alpha-hydroxy acids by contact with such strong mineral acids.

During the interaction of polyhydric alcohols with the alpha-hydroxy acids and/or estolides according to the method of this invention, four reactions may occur singly, simultaneously or consecutively as determined by the reaction conditions and other variables. These four reactions are termed estolide formation, esterification, dehydroxylation and polymerization.

Estolide formation relates to the inter-esterification between two molecules of alpha-hydroxy acid whereby the estolide is formed. The reaction takes place rapidly in the general temperature range of about 100 to 150° C. in the absence of a catalyst or alternatively in the temperature range of about 60 to 100° C. in the presence of an acid catalyst. Catalysts which are particularly active for this reaction include such acids as benzene sulfonic, toluene sulfonic, naphthalene sulfonic, sulfuric, chlorosulfonic, boric, phosphoric and the like. The reaction is promoted by the presence of solvents such as benzene, toluene, xylene and the like. The removal of water from the reaction mixture is desirable in order to complete the reaction. Estolide formation is reversible only by saponification of the estolide and careful acidification of the saponified mixture to free the acids and prevent reformation of the estolide.

The esterification reaction occurs under substantially the same conditions and in the presence of the same solvents as have been described for the estolide formation with the exception that the esterification takes place between a hydroxyl group of the polyhydric alcohol, for example, and the free carboxyl group of any of the acid components of the reaction mixture. Free carboxyl groups for the esterification of the polyhydric alcohol may be furnished by alpha-hydroxy acids, estolides or dehydroxylated estolides. The reaction temperatures in the presence or absence of an esterification catalyst corresponds to those temperatures described hereinbefore for estolide formation.

The dehydroxylation reaction refers to the intra-molecular dehydration of estolides or esters of estolides wherein the hydroxyl group alpha to the ester linkage of the estolide component is removed with the formation of an unsaturated bond which is alpha-beta with respect to the ester linkage of the estolide. The dehydroxylation reaction further refers to the intra-molecular dehydration of alpha-hydroxy acids and esters of alpha-hydroxy acids wherein the hydroxyl group is removed with the formation of an alpha-beta unsaturated acid or an ester of an alpha-beta unsaturated acid respectively. Under the usual reaction conditions wherein the polyhydric alcohol is present in an amount which is roughly the stoichiometrically equivalent to the estolides present and which can be formed from alpha-hydroxy acids, the alpha-hydroxy acid grouping is rapidly converted to the estolide which is in turn esterified. For this reason, the production of alpha-beta unsaturated acids and esters of unsaturated acids is usually small compared to the production of dehydroxylated estolides and esters of dehydroxylated estolides. The dehydroxylating reactions are relatively slow compared to both estolide-forming and esterification reactions and also require a higher temperature. In the absence of a catalyst the dehydroxylation reaction occurs in the temperature range of about 150 to 200° C. and in the presence of a catalyst in the temperature range of about 100 to 150° C. Catalysts which promote estolide formation and esterification similarly promote dehydroxylation. The reaction is likewise favored by the presence of a solvent and suitable solvents include the aromatic solvents which have been mentioned hereinbefore.

The polymerization reaction refers to the polymerization of the unsaturate linkage formed by the dehydroxylation of estolides or esters of estolides. In the absence of a catalyst the reaction takes place at temperatures above about 190° C. and in the presence of a catalyst at temperatures between 100 and 200° C. depending upon the nature of the catalyst. Catalysts which are moderately effective for the polymerization reaction include the acid catalysts which have been disclosed hereinbefore for the other three reactions. The more effective catalysts for the polymerization reaction include organic peroxides, organic hydroperoxides and the like. Particularly effective are benzoyl peroxide, cumene hydroperoxide, tertiary butyl hydroperoxide and dimethyl cyclopentyl hydroperoxides.

In the preferred method for preparing gelled esterified derivatives of alpha-hydroxy acids and/or estolides according to the process of this invention the alpha-hydroxy acid and/or estolide is mixed with a polyhydric alcohol such as glycerol, pentaerythritol, dipenta-erythritol, sorbitol, manitol, diethanol amine, triethanol amine or the like. The resulting solution is heated to a temperature in the range of about 150 to 200° C. and preferably in the presence of an aromatic hydrocarbon solvent. Under these conditions the alpha-hydroxy acids are partially converted to their estolides, alpha-hydroxy acids and estolides are esterified, and alpha-hydroxy acids, estolides and esters thereof are dehydroxylated simultaneously. The esterification and dehydroxylation of alpha-hydroxy acids under the normal conditions wherein approximately the stoichiometrically equivalent amount of the polyhydric alcohol is employed is usually small compared to the formation of estolides from the alpha-hydroxy acids and their subsequent reaction leading to esterified dehydroxylated estolides. The reaction mixture is maintained at 150 to 200° C. for a period of time sufficient to effect appreciable esterification and dehydroxylation but which is insufficient to effect gelation of the reaction mixture. The time required for a given mixture to gel varies with the nature of the reactants and other variables, and is most easily estimated by preliminary experiment. The reaction mixture may be maintained at the reaction conditions for from 50 to 90% of the estimated gelation time whereby a liquid reaction mixture remains. The incompletely reacted liquid is cooled to a curing temperature which is preferably between about 75 and 125° C. and maintained at the curing temperature until the desired semi-solid or solid reaction product is ultimately obtained. The speed of gelation is greatly decreased by lowering the temperature from the initial reaction temperature to the curing temperature. Greater product control is obtainable at the reduced reaction rates and a more uniform product can be produced in successive operations.

Alternatively, about 0.1 to 5% by weight of a dehydroxylation catalyst such as have been described hereinbefore may be added to the mixture undergoing reaction while the reaction temperature is maintained in the range of about 100 to 150° C. for about 50 to 90% of the estimated time required for gelation. The gelation can then be effected at a curing temperature of about 50 to 100° C. In still another modification the principal reaction can be effected in the absence of a catalyst, the catalyst added and the curing step effected in the presence of the catalyst.

In another modification of this invention the alpha-hydroxy acids and/or estolides are first reacted in the absence of the polyhydric alcohol to convert the alpha-hydroxy acids to estolides and to dehydroxylated estolides. The alpha-hydroxy acids and/or estolides are heated in the absence of a catalyst to a temperature in the range of about 150 to 200° C. and preferably in the presence of an aromatic hydrocarbon solvent. If desired, about 0.1 to 5.0% by weight of an estolide-forming and dehydroxylation catalyst may be employed in which case the reaction temperature is lowered to a range of about 100 to 150° C. The course of the reaction can be followed from titration data and the amount of water liberated by the reaction and the reaction may be carried to any desired extent of completion. Following the formation of dehydroxylated estolides a polyhydric alcohol is added to the mixture and the temperature is maintained in the range of about 100 to 200° C. for a period of time which is, for example, between 50 and 90% of the known or estimated gelation time for the mixture. If desired, about 0.1 to 5.0% by weight of an esterification-dehydroxylation catalyst may be added. If such a catalyst is added, or is present from the dehydroxylation step, the reaction temperature is controlled in the range of about 100 to 150° C. The incompletely reacted mixture is cooled and maintained at a temperature in the range of about 75 to 125° C. in the absence of a catalyst, or in the range of about 50 to 100° C. in the presence of a catalyst for a period of time sufficient to complete gelation. As a result of the lowered rate of gelation greater control of product quality is obtained.

In still another modification of this invention the mixture of alpha-hydroxy acids and/or estolides is first reacted with a polyhydric alcohol to form estolides and esterified derivatives. These reactions may be effected by heating the mixture of alpha-hydroxy acids and/or estolides with the polyhydric alcohol and preferably in the presence of an aromatic hydrocarbon solvent to a temperature in the range of 100 to 150° C. in the absence of a catalyst or to between 60 to 100° C. in the presence of about 0.1 to 5.0% by weight of an esterification catalyst to complete the esterification to any desired extent. Following the formation of the esterified derivatives the mixture is heated and maintained in the neighborhood of about 150 to 200° C. in the absence of a catalyst or to about 100 to 150° C. in the presence of a catalyst for a period of time which is, for example, 50 to 90% of the time required for gelation. The reaction mixture is then cooled to a temperature in the range of about 100 to 150° C. in the absence of a catalyst or to 50 to 100° C. in the presence of a catalyst and maintained at such temperatures until gelation has been completed.

In preparing esterified derivatives of alpha-hydroxy acids and/or estolides it is preferable to employ approximately the stoichiometrically equivalent amount of poly-functional alcohol which is required to esterify the mixture of estolides and dehydroxylated estolides, assuming that the alpha-hydroxy acid content is completely converted to estolides during the reaction sequence. Although it is preferable to use the aforementioned stoichiometric equivalent we may also employ amounts of poly-functional alcohols which range from about 1.0 to 2.0 times the aforedescribed theoretical amount.

Although polyhydric alcohols having more than 10 carbon atoms may be employed in this invention, it is generally preferable to employ those polyhydric alcohols having fewer than 10 carbon atoms such as glycerol, sorbitol, mannitol, penta-erythritol and the like. Although the preferred alcohols for use in this invention are the aliphatic polyhydric alcohols, polyhydric aromatic alcohols and phenols may also be employed under substantially the same conditions as are employed for the aliphatic polyhydric alcohols. Suitable polyhydric aromatic alcohols and phenols which may be employed in the invention include para-(beta hydroxy ethyl)-benzyl alcohol, catechol and resorcinol, phloroglucinol and the like.

Although the foregoing description of this invention has been directed to the reactions of alpha-hydroxy acids and/or estolides, the same two-step process involving a reaction stage and a curing stage is applicable to the preparation of other derivatives of alpha-hydroxy acids and/or estolides which form gelled reaction products. Gelled products having similarly useful properties can be prepared by reacting alpha-hydroxy acids and/or estolides with poly-functional compounds other than polyhydric alcohols, such as amino-alcohols and poly-amines under substantially the same reaction conditions as have been described hereinbefore for the use of polyhydric alcohols. For the preparation of such derivatives it is desirable to employ those poly-functional amino-alcohols and poly-amines having less than 10 carbon atoms such as ethanol amine, diethanol amine, triethanol amine, 2-amino octanol-1, meta-amino phenol, amino xylenols, ethylene diamine, propylene diamine, 1,8-diamino octane, para-phenylene diamine and the like. When it is desired to produce slightly gelled derivatives of amino-alcohols or poly-amines the reaction is partially completed at a reaction temperature corresponding to that which would be employed for a polyhydric alcohol as described hereinbefore, the liquid product withdrawn and cured at a temperature below the reaction temperature in substantially the same manner as has been described hereinbefore. In general, poly-amines and amino-alcohols may directly be substituted for the polyhydric alcohols in any of the foregoing processes employing polyhydric alcohols. The amount of amino-alcohol or poly-amine employed may vary from about 1.0 to 2.0 times the theoretical. The theoretical amount is calculated by assuming that all alpha-hydroxy acids are converted to estolides and that each primary or secondary amino group or each hydroxyl group requires one molecule of estolide for reaction.

In any of the foregoing applications of this invention for the preparation of esterified derivatives, non-gelation agents may be added to the mixture undergoing dehydroxylation in order to delay gelation of the reaction mixture until the dehydroxylation reaction has reached the desired stage. Suitable non-gelation agents are such organic acids as those which contain a conjugated diene grouping and which can enter into the coesterification reaction. These include linoleic acid, linolenic acid, acrylic acid, methacrylic acid, abietic acid and the like. However, non-gelation agents which are not acidic may also be used. These include turpentine, styrene, alpha-methyl styrene, isoprene, butadiene, pentadiene, cyclopentadiene, esters of linoleic acid, esters of linolenic acid, esters of abietic acid, esters of acrylic acid, esters of methyacrylic acid, acrylonitrile and the like.

The added agent may be employed for primary purposes of preventing gelation and in these instances the amount of non-gelation agent is employed which corresponds to about 0.05 to 0.5, preferably between about 0.1 to 0.3 mole of added agent per mole of alpha-hydroxy acid and/or estolide. When the added agent is selected from the aforementioned non-acidic group, an amount of poly-functional alcohol is employed which is stoichiometrically equivalent to the amount of estolide which is employed and/or which is formed from the alpha-hydroxy acids during the esterification. When the non-gelation agent is selected from the group of acids mentioned hereinbefore, an amount of poly-functional alcohol is employed which may be the stoichiometric equivalent for the complete esterification of the estolides and estolides formed in the reaction, and also for the added acidic non-gelation agent. Although it is desirable to use an amount of poly-functional alcohol sufficient to esterify the total organic acid content, this is not necessary since amounts other than the equivalent may be used if desired to produce an acidic or alcoholic product as the case may be.

The curing or low temperature gelation step may also be employed advantageously to effect polymerization where such polymerization is desirable. The results which are obtained are generally similar to those which are obtained with the use of polymerization catalysts at a higher temperature with the exception that greater process control is obtained thereby. For this purpose, varying amounts of polymerization catalysts such as benzoyl peroxide, cumene hydroperoxides, tertiary butyl peroxide and dimethyl cyclopentyl hydroperoxide or other such organic peroxides may be employed. It is usually preferable to employ these catalysts in the amount of about 0.001 to 1% by weight based on the final gelation product and the peroxide is preferably added at the beginning of the curing step while the reaction mixture is still in a liquid state.

Perhaps this invention can best be understood by reference to the following specific examples:

*Example I*

About 8600 parts by weight of a refined petroleum wax, having a melting point between 145° F. and 155° F., were introduced into an oxidation vessel provided with heating and cooling coils. The wax was melted and the temperature increased to about 265° F., at a pressure of about 75 to 80 pounds per square inch gauge. Air was employed as the oxidizing agent and was passed through the oxidation vessel at a rate of 5.5 cubic feet per barrel per minute. At the end of about 24 hours the oxidation reaction had begun to progress satisfactorily and the temperature was lowered to 250° F. The course of the reaction is illustrated by reference to the following table showing the acid number of the wax being oxidized at various times during the reaction:

| Time, Hours | Acid No. |
|---|---|
| 12 | Neutral 1.4 |
| 24 | 12.6 |
| 30 | 36.0 |
| 36 | 70.6 |
| 48 | 108.1 |
| 60 | 131.6 |
| 72 | 154.0 |
| 90 | 206.0 |
| 120 | 250.0 |
| 132 | |

During this particular oxidation, quantities of partially oxidized wax were withdrawn at two different intervals during the run, 680 parts by weight of 36 acid number wax and 1690 parts by weight of 102 acid number wax being withdrawn, leaving 4560 parts by weight of a wax oxidate which was oxidized to an acid number of 250. The latter wax oxidate having an acid number of 250 contains considerable amounts of useful low molecular weight water-soluble organic acids which appear to be a mixture of fatty acids, hydroxy acids and dicarboxylic acids, and these compounds were removed by extraction with between 5 and 10 volumes of hot water of about 100° C.

About 1000 parts by weight of the water washed 250 acid number wax oxidate was subjected to the fractionation process using the borax methods. This amount of wax oxidate was mixed with 1650 parts by weight of a 9.1 per cent by weight solution of sodium borate at a temperature of about 70° C. The mixture thus formed was then extracted three times with 1500 parts by weight of a light gasoline at a temperature of 70° C. and the resulting hydrocarbon and aqueous phases separated. The aqueous borax-soap-complex phase was subsequently heated to about 95° C. to evaporate the gasoline dissolved in the extraction step. The aqueous soap-complex phase was subsequently acidified with 69.5 parts by weight of 42% sulfuric acid whereby the alpha-hydroxy acids and estolides of alpha-hydroxy acids were separated. The separated alpha-hydroxy acid-estolide fraction was water washed to remove the inorganic acids and salts. The purified estolide-alpha-hydroxy acid fraction thereby produced contained about 5 per cent by weight of dissolved water.

The hydrocarbon or gasoline phase of hydrocarbon-soluble acids obtained in the extraction step was subjected to a further extraction with 192 parts by weight of a 13 per cent by weight solution of sodium borate in water at a temperature of 70° C. thereby forming a soap complex with the small amount of remaining alpha-hydroxy acids and estalides which were not retained in sodium borate solution during the extraction with light gasoline. The borax-soap-complex phase was separated and was acidified with 42 per cent sulfuric acid to separate a crude alpha-hydroxy acid-estolide fraction. The hydrocarbon phase was subsequently extracted with 1670 parts by weight of a 5% by weight solution of sodium carbonate, thereby forming the water-soluble sodium soaps of the gasoline-soluble acids present. The aqueous sodium carbonate phase was subsequently separated and heated to about 95° C. to remove residual gasoline dissolved in the extraction step. The carbonate solution was then acidified with one equivalent of 42 per cent sulfuric acid per equivalent of gasoline-soluble soap. The gasoline-soluble acids, present as their sodium soaps, are liberated as the acids and were water washed. This fraction comprises the purified fatty acids from the oxidized wax. The carbonate-water-washed hydrocarbon phase containing the neutral bodies was distilled to recover gasoline therefrom. The residual neutral product obtained thereby was comparatively pure.

The following table indicates per cent recovery of each of the fractions based on the water-washed oxidized wax, and the characteristics of each of the acid fractions obtained therefrom:

| | Weight Percent Yields a (Approx.) | Approximate Analysis | | |
|---|---|---|---|---|
| | | Acid No. | Sap. No. | Percent Neutrals |
| Alpha-hydroxy acids and Estolides | 48 | 207 | 349 | 3.0 |
| Naphtha-Soluble Fatty Acids | 36.4 | 160 | 226 | 3.0 |
| Neutral Compounds | 15.6 | 4 | 87 | | a Based upon the water washed 250 acid number wax oxidate.

Example II

A portion of the oxidized wax prepared in Example I, having an acid number of about 250, was water washed three times with about 10 volumes of hot water at 100° C. in order to remove the water-soluble constituents. A portion of the water washed oxidized wax amounting to 1000 parts by weight was slurried with about 10 volumes of light gasoline having a boiling range of 50 to 85° C. in order to remove the hydrocarbon-soluble material. The amber-colored, hydrocarbon-insoluble phase was twice extracted with a total of about 10 volumes of the light gasoline after which the insoluble phase was heated to about 95° C. to evaporate the light gasoline therefrom. The hydrocarbon-insoluble material amounted to 540 parts by weight, corresponding to a yield of 54% based on the water washed oxidate. The composition of the hydrocarbon-insoluble fraction was as follows:

| Components | Mole Percent of Total |
|---|---|
| Alpha-hydroxy acids | 23.5 |
| Estolides | 52 |
| Fatty Acids | 13.5 |
| Neutral Compounds | 11 |

Example III

About 400 parts by weight of the purified alpha-hydroxy acid-estolide fraction obtained in Example I, 209 parts by weight of potassium hydroxide, 200 parts by weight of water, 160 parts by weight of ethyl alcohol were introduced into a flask which was fitted with a gas trap and the mixture was heated and maintained at 90° C. for approximately 4½ hours. At the end of this time no volatile gases had been evolved by the reaction mixture. The saponified mixture was then diluted with 2000 parts by weight of water and subsequently acidified to a pH of 3, with 10% sulfuric acid. During the acidification, the solution was vigorously agitated with air and the acid was added slowly and in such a way that the contact of the liberated acids with the strong mineral acid being added was minimized. The acidified mixture was then extracted with about 800 parts by weight of peroxide-free ether, water washed and dried and the ether then removed by evaporation. About 368 parts by weight of amber-colored enriched alpha-hydroxy acids were obtained therefrom, corresponding to a yield of 92 per cent by weight based on the original mixture of alpha-hydroxy acids and estolides. Analysis of the saponification feed stock and product showed that on a neutral oil and fatty acid-free basis, the feed stock contained 72 mole per cent estolides and 28 mole percent alpha-hydroxy acids, whereas the saponification product contained 11 mole per cent estolides and 89 mole per cent of alpha-hydroxy acids.

*Example IV*

About 100 parts by weight of the dry purified alpha-hydroxy acid-estolide mixture (approximately 28 mole per cent alpha-hydroxy acids) obtained in Example I and 45 parts by weight of refined xylenes were placed in a flask fitted with a reflux condenser and a water trap such that any water formed in the flask could be azeotroped overhead with the xylene, separated from the distillate by gravity into the water trap, collected and measured. The reaction mixture was refluxed for about 19 hours while the contents of the flask were maintained at about 150° C. The amount of water collected in the water trap corresponded to a theoretical conversion of the alpha-hydroxy acids to the estolide. The acid number and saponification number were determined on the reaction product and these data confirmed the fact that the estolide has been formed. The amount of side reaction leading to the dehydroxylation of the estolide was found to be about 5 mole per cent. A portion of the reaction product was evaporated to remove the xylene whereupon a light brown-colored estolide fraction was obtained.

*Example V*

About 100 parts by weight of the purified alpha-hydroxy acids and estolides prepared according to the method described in Example I and 12 parts by weight of pentaerythritol were placed in an open stainless steel reaction vessel, slurried and heated to a temperature of about 175 to 185° C. Five aliquot samples of the reacting mixture were taken at the end of 190, 205, 220, 225 and 230 minutes of reaction time respectively and cooled. The consistency of the five samples at room temperature varied from a viscous fluid to a non-flowable solid. The non-flowable solid material representing 230 minutes reaction time was a typical gelled product corresponding to about 65 per cent completion of the esterification reaction and about 35 per cent completion of the dehydroxylation reaction. Each of the five respective samples was placed in a constant temperature oven and maintained at about 100° C. for 65 hours. During the curing at 100° C. the viscous liquid sample solidified and the semisolid and solid samples hardened into friable masses. The cured samples corresponding to 190 and 205 minutes of reaction time at 175 to 185° C. respectively possessed roughly the same general physical characteristics as the non-cured sample representing 230 minutes of reaction time at 175 to 185° C. By increasing the curing time or the curing temperature each of the products is rendered progressively more solid.

In another experiment the portion of the aliquot sample representing 220 minutes of reaction time at 175 to 185° C. is dissolved in about four volumes of refined xylene. A polished aluminum strip is dipped into the solution, allowed to dry and placed in an oven at 100° C. for about 24 hours. The aluminum strip is thereby coated with a hard, tough coating which is resistant to the action of aromatic solvents. Substantially the same results are obtained when other metal strips such as steel, galvanized iron and the like are substituted for the aluminum.

The drying properties of the esterified-dehydroxylated product representing 190 minutes of reaction at 175–185° C. are evaluated as follows. A 10% by weight solution of the reaction product in xylene is prepared and is maintained at 75° C. in a closed system for 24 hours. The solution is then mixed with about 0.1% by weight based on the solvent-free reaction product of a cobalt naphthenate drying oil catalyst which contains about 6% by weight of cobalt metal. Aluminum metal strips are dipped in the solution, drained, and dried at 40° C. for ten hours. A hard, tough film remains on the metal strip.

*Example VI*

About 100 parts by weight of the purified alpha-hydroxy acids and estolides prepared according to the method described in Example I, 12 parts by weight of glycerol, and 45 parts by weight of xylene are placed in a flask fitted with a reflux condenser and water trap for collecting the water liberated in the reaction flask and azeotroped overhead with the xylene distillate. The mixture is maintained at about 155–160° C. for a period of about 11 hours at which point a soft gel is already formed. Titration data on the product and the liberated water indicate that the esterification is about 71 per cent complete and that the dehydroxylation is about 21 per cent complete. The experiment is then repeated with the exception that the reaction mixture is maintained at 155–160° C. for about 10 hours and the liquid reaction mixture is then cooled and maintained at 125° C. for an additional 10 hours. The product from the curing step is a soft gel similar to the gel prepared by heating for 11 hours at 170° C. Substantially the same results are obtained when sorbitol is substituted for glycerol with the exception that a somewhat shorter reaction and curing time is employed because of the increased tendency of sorbitol to form gels.

*Example VII*

About 100 parts by weight of the impure alpha-hydroxy acids and estolides prepared according to the method described in Example II, 12 parts by weight of glycerol, 45 parts by weight of xylene and 2 parts by weight of benzene sulfonic acid are placed in a flask fitted with a reflux condenser and a water trap similar to that described in the preceding example and refluxed for about 13.8 hours at a temperature of 130° C. The resulting gelled product is estimated to be 85% esterified and 31% dehydroxylated. The experiment is then repeated with the exception that the mixture is maintained at 130° C. for only 12 hours and the resulting liquid is subsequently cured at a temperature of about 75° C. for 65 hours. A gel is obtained from the second experiment which is physically similar to the product obtained by completing the reaction at 130° C. to the gel stage in the first experiment.

*Example VIII*

About 100 parts by weight of purified alpha-hydroxy acids prepared according to the method described in Example III, 12 parts by weight of glycerol, and 9.5 parts by weight of toluene are placed in a flask fitted with a reflux condenser and water trap to collect the water formed in the reaction flask and azeotroped overhead with the toluene distillate wherefrom it separates as a second liquid phase and is withdrawn while the toluene phase is returned to the reacting mixture. The mixture is refluxed at 140° C. for 16 hours at which time gelation occurs. The titration data and the amount of water liberated indicate that the product is about 71 per cent esterfied and about 21 per cent dehydroxylated. The experiment is then repeated with the exception that a reaction time of 14 hours at 140° C. is employed after which the liquid reaction mixture is withdrawn and cured at a temperature of 100° C. for a period of 24 hours. The product obtained from the two-stage reaction and curing process is physically similar to the product obtained from single-stage completion of the reaction at 140° C.

Example IX

About 80 parts by weight of the purified estolides prepared according to the method described in Example IV, 12 parts by weight of glycerol, 9.5 parts by weight of toluene and 20 parts by weight of purified rosin are reacted at a temperature of 140° C. for 22 hours. The semi-solid product obtained thereby is indicated to be 63 per cent esterified and 56 per cent dehydroxylated. When the reaction is repeated with the exception that the reaction mixture is cooled after 18 hours to a curing temperature of about 100° C. and maintained at 100° C. for about 100 hours, a soft gel is obtained. The soft gel possesses good drying properties when tested according to the method described in Example V.

Example X

About 100 parts by weight of the purified alpha-hydroxy acids and estolides according to the method described in Example I, 12 parts by weight of glycerol, 9.5 parts by weight of xylene and 15 parts by weight of styrene are reacted at a temperature betwen 160 and 165° C. for a period of 11 hours at which time the reaction mixture sets to a light gel. The product is indicated to be 63 per cent esterified and 30 per cent dehydroxylated. When the experiment is repeated with the exception that the reaction is discontinued at 9.5 hours and the mixture is subsequently cured for 24 hours at a temperature of 100° C. a resilient solid product is obtained. When the product is less severely cured, the resultant product possesses drying properties.

Example XI

About 100 parts by weight of the purified alpha-hydroxy acid-estolide mixture, prepared according to the method described in Example I, are dissolved in about 45 parts by weight of an aromatic hydrocarbon fraction boiling in the range of about 175 to 185° C. The resulting hydrocarbon solution is placed in a flask fitted with a reflux condenser and a water trap. The mixture is maintained at a temperature of about 200° C. in order to maintain a reflux. After about 30 hours of refluxing the water collected in the trap corresponds to about 50 per cent dehydroxylation of the estolide. About 12.5 parts by weight of pentaerythritol are added to the dehydroxylated estolide-containing mixture along with about 45 parts by weight of xylene. The mixture is refluxed at a temperature of about 150–160° C. for a period of about four hours. The soft gelled product is estimated to be about 40 per cent esterified.

When the experiment is repeated with the exception that the esterification step is continued for only three hours at 150–160° C. and the liquid reaction mixture is then cured at a temperature of 100° C. for 24 hours, a soft gelled product is obtained of approximately the same consistency as that obtained by completing the reaction at 150–160° C. for four hours. In order to evaluate the drying properties of the cured product a 10% by weight solution of the cured product on a solvent-free basis is prepared by diluting the reaction mixture with a sufficient amount of toluene. This solution is then mixed with about 0.1% by weight based on the reaction product of a cobalt naphthenate drying oil catalyst which contains about 6% by weight of cobalt metal. An aluminum strip is dipped into the solution, drained, and allowed to drain at a temperature of 40–50° C. for three hours. A tough, flexible non-tacky coating remains on the metal panel. The coating is not removed by washing with xylene, benzene, carbon tetrachloride or other common solvents. Harder and tougher surfaces are obtained by drying the strips at high temperatures, such as in the range of 50 to 100° C.

Example XII

About 100 parts by weight of the impure mixture of alpha-hydroxy acids and estolides prepared according to the method described in Example II are dissolved in about 45 parts by weight of an aromatic hydrocarbon fraction boiling in the range of about 175 to 185° C. The resulting hydrocarbon solution is placed in a flask fitted with a reflux condenser and a water trap. The mixture is maintained at a temperature of about 190° C. for about 50 hours, during which time the water collected in the trap corresponds to about 40% dehydroxylation of the estolide. About 13 parts by weight of diethanol amine are added to the dehydroxylated estolide-containing mixture along with about 45 parts by weight of xylene. The mixture is refluxed at a temperature of about 150° C. for about 8 hours. A soft gelled reaction product is obtained thereby.

The foregoing experiment is then repeated with the exception that the reaction with the diethanol amine is carred out for only 5 hours at 150° C. and the liquid reaction mixture is then cured at a temperature of 110° C. for 30 hours. The soft gelled product which is obtained is physically similar to that obtained by completing the reaction at 150° C. for 8 hours. Substantially the same favorable results are obtained when about 14 parts by weight of 1,2-diamino propane is substituted for the diethanol amine.

Example XIII

About 100 parts by weight of the purified estolides prepared according to the method described in Example IV, 22 parts by weight of resorcinol, 9½ parts by weight of toluene, and 3 parts by weight of benzene sulfonic acid are reacted at a temperature of 140° C. for 20 hours. A semi-solid reaction product is obtained thereby. The reaction is then repeated with the exception that the reaction is continued for 18 hours at 140° C. and the liquid reaction mixture is then cooled to a curing temperature of 100° C. and maintained for 40 hours at the lower temperature. A soft gel is obtained from the curing step which is physically similar to the product obtained in the first experiment. Substantially the same favorable results are obtained when 22 parts by weight of paraphenylene diamine is substituted for the 22 parts by weight of resorcinol.

The foregoing disclosure of our invention is not to be considered as limiting since many variations may be made by those skilled in the art without departing from the spirit or scope of the following claims.

We claim:

1. A process for the production of gelled and partially gelled derivatives which comprises heating at least one carboxylic acid selected from the class consisting of alpha-hydroxy acids containing 5 to 30 carbon atoms per molecule and estolides and dehydroxylated estolides containing 10 to 60 carbon atoms per molecule in the presence of between 1 and 2 stoichiometric equivalents of a polyfunctional organic compound having less than 10 carbon atoms per molecule and selected from the class consisting of polyhydric alcohols, poly-amines and amino-alcohols at a reaction temperature between 100° C. and 200° C. for a time sufficient to liberate water and to effect an incomplete reaction of said carboxylic acid with said polyfunctional organic compound but insufficient to cause gelation, cooling the resulting fluid reaction mixture and curing said reaction mixture at a temperature between 75° C. and 125° C., but at a temperature lower than said reaction temperature, for a time sufficient to effect gelation.

2. A process according to claim 1 wherein the polyfunctional organic compound is a polyhydric alcohol.

3. A process according to claim 1 wherein said polyfunctional organic compound is pentaerythritol.

4. A process according to claim 1 wherein the polyfunctional organic compound is a polyamine.

5. A process according to claim 1 wherein the polyfunctional organic compound is an aminoalcohol.

6. A process according to claim 1 wherein said reaction temperature is between 100° C. and 150° C. and said heating is effected in the presence of between 0.1 and 5% by weight of a catalyst comprising an organic peroxide.

7. A process for the production of gelled and partially gelled derivatives which comprises heating a mixture of alpha-hydroxy acids containing 5 to 30 carbon atoms per molecule and estolides containing 10 to 60 carbon atoms per molecule in the presence of between 1 and 2 stoichiometric equivalents of a polyfunctional organic compound having less than about 10 carbon atoms per molecule and selected from the class consisting of polyhydric alcohols, poly-amines and amino-alcohols at a reaction temperature between 150° C. and 200° C. for a time sufficient to liberate water and to effect incomplete reaction of said acids and estolides with said polyfunctional organic compound but insufficient to cause gelation thereby producing a fluid reaction mixture, cooling said fluid reaction mixture and consequently converting said fluid reaction mixture into a gelled product at a temperature between 75° C. and 125° C., by maintaining the reaction mixture at said lower temperature until gelation occurs.

8. A process according to claim 7 wherein said polyfunctional organic compound is glycerol.

9. A process for the production of gelled esterified derivatives which comprises heating a mixture of estolides and dehydroxylated estolides containing between 10 and 60 carbon atoms per molecule with between about 1 and 2 stoichiometric equivalents of a polyfunctional organic compound having less than 10 carbon atoms per molecule and selected from the class consisting of polyhydric alcohols, poly-amines and amino-alcohols at a reaction temperature between 100° C. and 200° C. for a time sufficient to liberate water and to effect incomplete reaction of said estolides with said polyfunctional organic compound but insufficient to effect gelation thereby producing a fluid reaction mixture, cooling said mixture to a temperature lower than said reaction temperature and between 75° C. and 125° C. and curing said mixture at said last-named temperature for a time sufficient to effect gelation.

10. A process for the production of gelled and and partially gelled derivatives which comprises subjecting at least one carboxylic acid selected from the class consisting of alpha-hydroxy acids containing 5 to 30 carbon atoms per molecule and estolides containing 10 to 60 carbon atoms per molecule to temperatures between 100° C. and 200° C. for a time sufficient to convert at least a part of said alpha-hydroxy acids to estolides and dehydroxylate at least a part of said estolides, adding between 1 and 2 stoichiometric equivalents of a polyhydric alcohol having less than 10 carbon atoms thereto, heating the resulting mixture at a temperature between 150° C. and 200° C. for a time sufficient to effect incomplete reaction with said polyhydric alcohol but insufficient to effect gelation, cooling the resulting fluid reaction product and curing said reaction mixture at a temperature between 75° C. and 125° C., for a time sufficient to effect gelation.

11. A process according to claim 10 wherein said polyhydric alcohol is pentaerythritol.

12. A process for the production of gelled and partially gelled derivatives which comprises heating a reaction mixture comprising alpha-hydroxy acids containing 5 to 30 carbon atoms per molecule, estolides containing 10 to 60 carbon atoms per molecule and between 1 and 2 stoichiometric equivalents of a polyfunctional organic compound having less than about 10 carbon atoms per molecule and selected from the class consisting of polyhydric alcohols, polyamines and amino alcohols, at a reaction temperature between about 150° C. and about 200° C. for a period of time between 50% and 90% of the gelation time of said reaction mixture at said temperature thereby producing a fluid partial reaction product and thereafter cooling said fluid partial reaction product at a temperature lower than said reaction temperature and being between about 75° C. and 125° C. and maintaining the mixture at said lower temperature until gelation occurs, said gelation time being that time required to cause gelation of said reaction mixture when maintained at said reaction temperature.

ORIN D. CUNNINGHAM.
ORVILLE L. POLLY.

References Cited in the file of this patent

UNITED STATES PATENTS

| Number | Name | Date |
|---|---|---|
| 1,884,023 | Luther | Oct. 25, 1932 |
| 2,164,188 | Groll | June 27, 1939 |
| 2,220,507 | Blount | Nov. 5, 1940 |
| 2,375,606 | Wirtel | May 8, 1945 |